Nov. 13, 1956 N. HIRSCH 2,770,685

HUM REDUCTION

Filed Feb. 4, 1952

INVENTOR.

BY N. HIRSCH

AGENT

United States Patent Office 2,770,685
Patented Nov. 13, 1956

2,770,685

HUM REDUCTION

Nathan Hirsch, Brooklyn, N. Y.

Application February 4, 1952, Serial No. 269,865

3 Claims. (Cl. 179—171)

The present invention relates to hum reduction systems, more particularly for amplifiers, radios and the like that are energized from alternating current power supplies.

Among the objects of the present invention is the provision of novel amplifiers, radios and the like with improved hum reduction arrangements.

Figure 1:
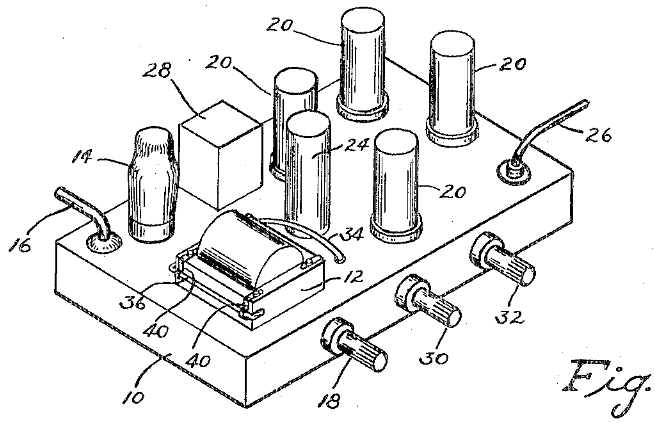
Figure 2:
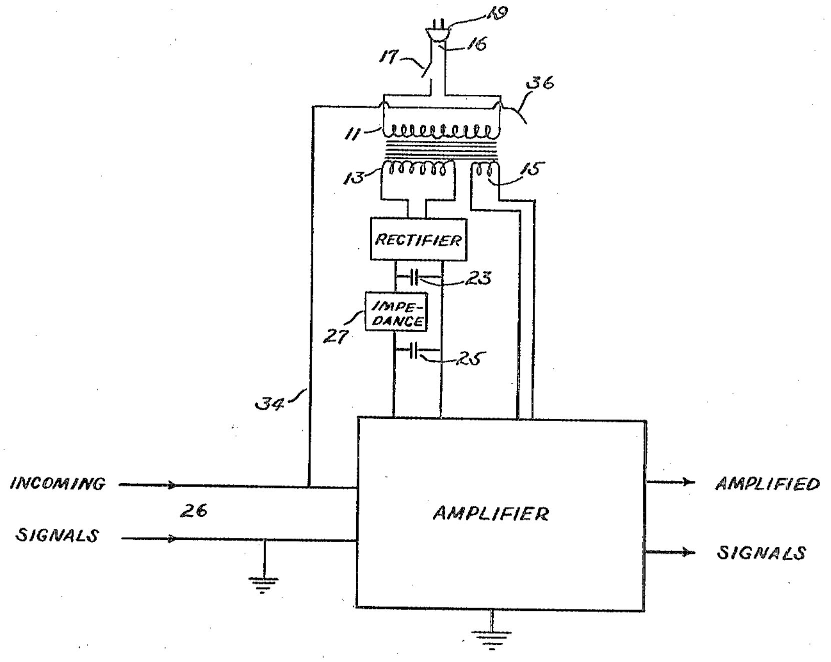

The above as well as additional objects of the present invention will be more completely understood from the following description of several of its exemplifications, reference being made to the accompanying drawings wherein:

Fig. 1 is a simplified showing of a typical amplification apparatus embodying the hum reduction features of the invention; and Fig. 2 is a wiring diagram illustrating the construction and operation of the apparatus of Fig. 1.

According to the present invention an amplification system or the like having an inductance-containing alternating electric current energized power supply unit is provided with a conductor linked with the inductance of the power supply unit and connected to the amplifier's signal input connection to balance out the undesired hum normally delivered by the amplifier along with the amplified signals.

The conductor providing the hum reduction is preferably an elongated lead having one end connected to the signal input connection, and the other end free and unconnected in the electrically conductive sense, the lead being located in the magnetic field of the inductance in the power supply unit. This causes the lead to develop a power frequency voltage that is impressed on the amplifier input along with the signals being amplified. By suitable selection, the lead is so disposed that the voltage it picks up is equal in intensity and opposite in phase with respect to the undesired hum so that substantially complete balancing can be effected.

Fig. 1 shows a typical construction exemplifying the invention. A chassis 10, which can be that of an amplifier or a radio receiver, includes a power supply assembly having a transformer 12, a rectifier tube 14 and a power supply lead or cable 16. In accordance with conventional practice, the power transformer 12 may have a primary winding connected directly to the power lead 16 through an on-off switch having a control shaft 18 projecting out for receiving an operating knob (not shown) by which it can be conveniently manipulated.

The power transformer can also have a multiplicity of secondary windings, some to supply heating current to the filaments of amplifying tubes such as those shown at 20, as well as to rectifier 14, where this is of the hot-cathode type. Another secondary winding supplies relatively high voltage for rectification by rectifier 14 to provide high voltage direct current through a bus wire, generally called B+, for energizing the electron-discharges of the amplifying tubes 20. Inasmuch as the rectifier's output is in the form of ripples or pulses of direct current, there is connected a filtering network, usually consisting of a pair of capacitors shunted across the output of an impedance, generally a resistor or inductor, in series in the output. Part or all of these filtering components may be mounted on top of the housing. As shown in Fig. 1, a single metal container 24 may house both filter capacitors, for example.

The signals to be amplified are supplied by way of an input cable 26 which is usually shielded by an external conductor such as a covering of metal braid. The cable is connected to the input terminals of the amplification assembly either directly or through coupling devices such as a capacitor or transformer. The amplification assembly can be of any desired type, the construction shown having a plurality of stages connected in cascade, and an output circuit coupled by an output transformer 28 to output leads, not shown. The specific details of the amplification assembly itself are subject to wide variation and any suitable form can be used, as shown for example in Rider's Perpetual Trouble Shooters Manuals published from time to time by the John F. Rider Publishing Co.

Additional controls indicated at 30, 32 can also be used as for example for varying the degree of amplification, tonal emphasis on portions of the signal's frequency spectrum, etc.

In accordance with the present invention an elongated conductor 34 which may be a length of standard wire ordinarily used to make electrical connections, has one portion 36 coupled to power supply transformer 12 and is connected to the input circuit of the amplifier assembly. The coupling of this wire with the transformer is arranged in such manner that there is induced in the wire an electrical voltage of power supply frequency and having a magnitude and phase such that it cancels out much if not all of the stray power line hum that normally would appear in the amplified signals as a result of imperfect shielding from the power line electric and magnetic fields. In actual practice it is considered just about impossible to prevent the injection of a definite hum component into the desired signals being amplified unless great pains are taken and expensive circuits are used.

A feature of the present invention is that a single length of wire of insignificant cost can be readily arranged to yield any desired reduction in hum pickup. By merely adjusting the position of a free or unconnected end of this wire with respect to the transformer it is possible to so adjust the intensity and phase of the power frequency voltage induced in the wire as to cause cancellation or bucking out of any part or all of any desired hum pickup that the desired signal would be subject to. In addition the amount or length of this wire that is coupled to the transformer can be varied so as to permit a further degree of control.

The voltage-inducing coupling of wire portion 36 appears to be partly purely magnetic and partly purely electrical. In other words, part of the magnetic flux of transformer 12 leaks away from its core and cuts across the wire portion 36 thereby inducing some of the balancing power frequency voltage. In addition, the electrical power frequency field present by reason of the relatively high power supply voltage present in and around the transformer also develops some power frequency voltage in conductor portion 36.

If desired a section of the conductor 34, such as the length between the coupling portion 36 and the amplifier input, can be shielded so that the balancing voltage is limited to a definite portion of the conductor to which the final adjustments can be limited. It should be noted that the phase of the balancing voltage can be completely reversed 180°) by merely reversing the orientation of portion 36. Furthermore, by rotating this portion, which in Fig. 1 is shown as roughly three-quarters of a complete loop, through a smaller or larger number of degrees with respect to the axis of the transformer 12, balancing voltages of correspondingly varied phases are produced.

The wire portion 36 is preferably fastened in place so as to maintain the desired hum reduction notwithstanding the application of mechanical disturbing forces either by reason of sound vibrations set up by highly amplified signals, or other influences such as shipping jars and bumps. In Fig. 1 a set of metal clips 40 is held on the transformer body, as by its assembly screws, and each clip is bent to receive and clamp over a portion of the wire. The clips can be of readily deformable and non-resilient metal, such as that generally called dead soft, so that they can be readily shaped and reshaped by hand without the use of any tools to hold the coupling wire in any desired position. However, stiffer wires requiring the use of adjusting tools can also be used even though not as conveniently.

Fig. 2 shows a suitable circuit diagram for the hum reduction of the present invention. The various elements of Fig. 1 are identified by the same numerals, with the on-off switch further shown at 17, the transformer primary at 11, secondaries at 13, 15, filter capacitors at 23, 25 and filter impedance at 27. A connection plug is also shown at 19 at the end of the power supply line 16.

It will be noted that lead 34 is directly connected to one of the amplifier input connections. If desired the connection can be made by means of a coupling device such as a series capacitor or even by leaving the wire 34 unconnected but extending closely alongside an unshielded portion of one of the incoming signal leads 26. The other lead of this pair is shown as directly grounded, that is, directly connected to a common return conductor usually the chassis itself. However, the incoming signal return may be grounded through a resistor, capacitor or combination of these two with or without an inductor, if desired. In addition the ground return may also be connected to one of the leads of the power supply line 16, without affecting the operation of the invention.

Where the power supply assembly includes another inductor, as for example where the filter impedance 27 is a filter choke, the balancing lead 36 can be coupled to this inductor instead of to power transformer 12. In fact the hum balancing of the present invention can be practiced with power supply assemblies of the so-called "transformerless" or "A. C.–D. C." type wherein the power supply currents are directly rectified without the benefit of voltage transformation, by merely using an inductor in the filter system and coupling lead 36 to this inductor.

According to a further aspect of the present invention, it is possible to provide commercially acceptable hum-free amplifiers with filtering capacitors and chokes somewhat smaller and less expensive than heretofore considered necessary. In addition very effective amplification is provided even when the amplifier uses amplification tubes with heater type filaments that are connected in the form of a series string across the power supply leads 16, for example. This type of connection is used with the so-called "A. C.–D. C." radio receivers but is objectionable for higher quality apparatus because the tube operating with the lowest level of signal causes the pickup of too much power frequency hum from its heater filament even though this filament is directly connected to the ground return conductor. However, the present invention enables such series filament connection with the accompanying saving in power transformer requirements and without sacrificing performance, by merely balancing out the undesired hum.

The hum reduction of the present invention is particularly efficacious with amplifiers of relatively high input impedances, that is about 50,000 or more ohms. Such systems require only a very small amount of coupling with the hum-generating inductor to give the described results. Accordingly as little as a half turn of loose coupling is often sufficient. The invention is, however, also suitable for amplifiers with lower input impedances, although more coupling may be needed.

As many apparently widely different embodiments of this invention may be made without departing from the spirit and scope hereof, it is to be understood that the invention is not limited to the specific embodiments hereof, except as defined in the appended claims. Thus the chassis 10 of Fig. 1 can be that of a complete radio receiver or sound amplifier of a television receiver. The additional components carried by such a chassis do not prevent the practice of the present invention with all its advantages.

What is claimed is:

1. A tube-type amplifier having an alternating current tube filament heating circuit, an input terminal for receiving signals to be amplified, an input impedance of more than 50,000 ohms a transformer type power supply unit for energization by alternating current electric power connected to operate the amplifier, and a hum-reducing combination of an electrical conductor having one end unconnected but at least partially wrapped around the transformer to pick up power supply hum of the desired phase and intensity, and having its other end connected to the input terminal to supply said picked up hum in balancing relation to the power line hum otherwise introduced into the amplified signals by the amplifier.

2. The invention as defined by claim 1 in which the electrical conductor is an elongated lead having its open end wrapped about three-fourths of a turn around the transformer.

3. In a radio receiver having a tube-type audio amplification section with an input impedance greater than 50,000 ohms, an ungrounded input lead to which demodulated radio signals are delivered for amplification, an alternating current tube filament heating circuit for said section, and a transformer power supply unit for energizing the receiver from an alternating current electric power line, the combination of an elongated conductor having one end connected to the ungrounded input lead and having its other end unconnected but held in place in the external magnetic field of the transformer to apply some power supply hum in balancing relation to the power line hum otherwise normally appearing in the amplified audio signals.

References Cited in the file of this patent

UNITED STATES PATENTS

| | | |
|---|---|---|
| Re. 19,232 | Dalpayrat | July 10, 1934 |
| 1,733,232 | Meissner | Oct. 29, 1929 |
| 1,969,902 | Roberts | Aug. 14, 1934 |
| 1,975,834 | Duncan | Oct. 9, 1934 |